Oct. 15, 1929.   J. G. WOOD   1,731,837
ENGINE MOUNTING
Filed Feb. 13, 1928
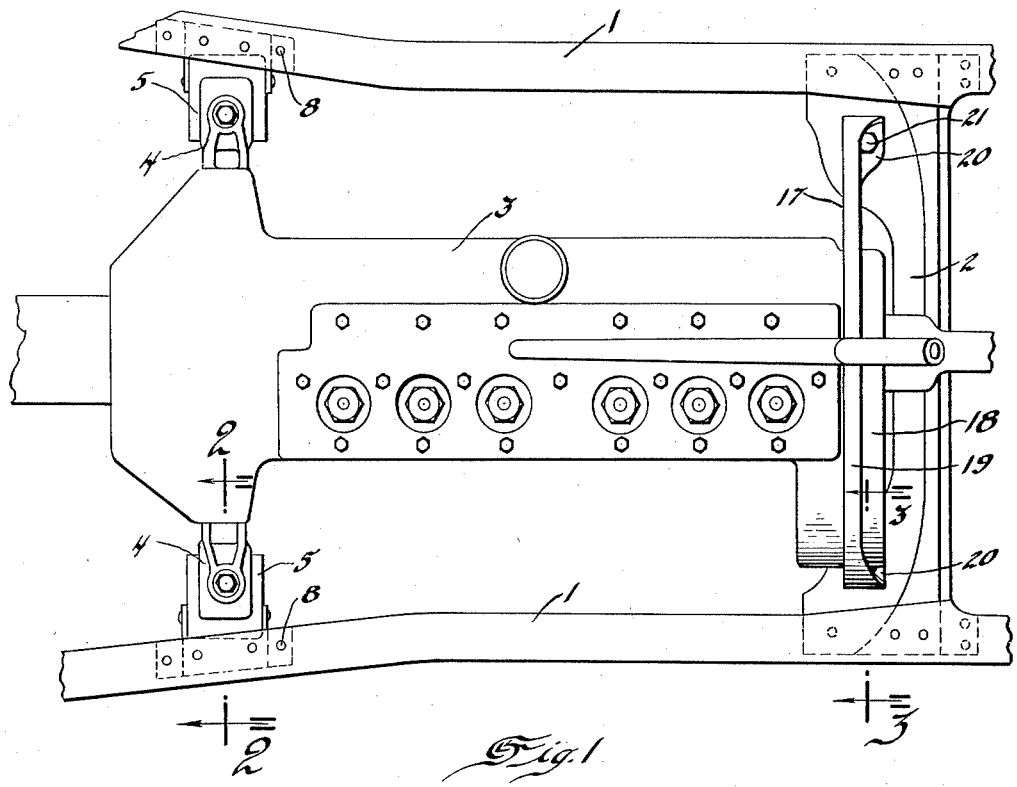
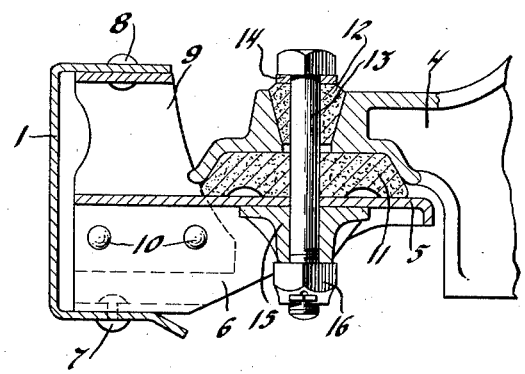
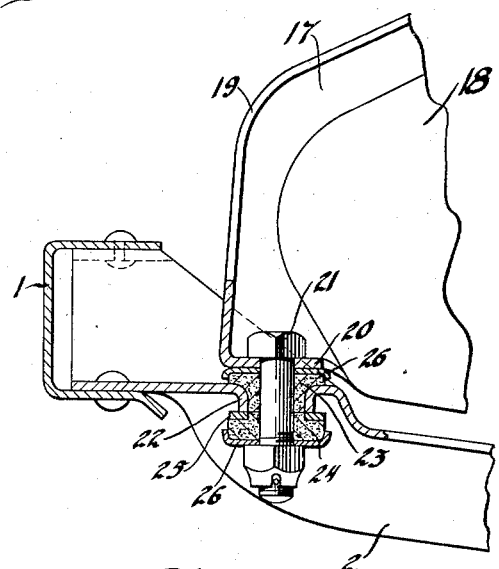
Inventor
John G. Wood
By Mackenzie, Spencer & Hick
Attorneys Patented Oct. 15, 1929

1,731,837

UNITED STATES PATENT OFFICE

JOHN G. WOOD, OF LANSING, MICHIGAN, ASSIGNOR TO GENERAL MOTORS CORPORATION, OF DETROIT, MICHIGAN, A CORPORATION OF DELAWARE

ENGINE MOUNTING

Application filed February 13, 1928. Serial No. 253,947.

This invention relates to motor vehicles and more particularly to an improvement in engine mountings.

One of the objects of the invention is to provide a resilient support whereby the engine may be more or less flexibly held in the chassis frame and insulated therefrom, so that the frame and body will be relieved of the inherent engine vibrations and driving reactions, and the engine and associated parts freed from the effects of frame weaving and distortion. The cushion mounting also increases the life of the vehicle parts by eliminating the imposition of undue strains and consequent breakage, reduces noise and improves the riding qualities of the car and comfort of passengers.

A further object of the invention is to provide a mounting of simple construction, so as to be economical in manufacture, and which enables the engine to be readily removed from the frame for repair, and the replacement of the mounting parts to be made at small cost.

Further objects and advantages will be apparent from the following specification, taken in connection with the accompanying drawing, in which:

Figure 1 is a top plan view of an engine supported in the frame in accordance with the present invention;

Figure 2 is a sectional view of the support at the rear of the engine and is taken on line 2—2 of Figure 1, and Figure 3 is a sectional view of the front support, having been taken on line 3—3 of Figure 1.

Referring to the drawing, the longitudinally extending channel shaped side members of a chassis frame are designated by the characters 1—1, and the transverse cross member at the front of the vehicle, by the numeral 2. The internal combustion engine 3 to be supported in the chassis frame, has a pair of legs or arms 4 projecting from the sides of the bell housing at the rear of the engine for attachment with inwardly extending brackets carried by the frame. For convenience and economy in manufacture, these brackets may be pressed or stamped in two parts from sheet metal, one of the parts providing a flat shelf-like portion 5, with dependent side flanges 6, terminating in lateral feet and secured by rivets 7 to the lower flange of the channeled frame member 1, and the other part constituting a brace, held by rivets 8 to the top flange of the frame member 1, with dependent side portions 9 secured by rivets 10 to the flanges 6. Interposed between the shelf 5 and engine arm 4, is a pad or block 11 or elastic deformable material, such as rubber, rubberized fabric, felt, or the like, and which is held or retained within a depression or recess formed in the underside of the engine arm. The pad 11 is preferably of rectangular shape to afford increased lateral stability to the mounting. Also formed in the engine arm 4 is a downwardly converging or conical opening, in which is positioned a conical body or sleeve 12, of rubber or other suitable elastic material, surrounding a fastening stud or bolt 13, which extends downwardly through the elastic disc 11 and the shelf 5. Between the head of the bolt 13 and the elastic sleeve 12, there is interposed a bearing washer 14, and a spacer sleeve 15 is carried by the bolt between the bottom of the shelf 5 and the castellated nut 16 screw-threaded on the lower end of the bolt. Adjustment of the nut 16 permits the elastic bodies 11 and 12 to be placed under an initial pressure to eliminate excessive responsiveness to deformation. The elastic pad 11 resiliently supports the weight of the engine, while the sleeve 12 cushions any tendency of the engine to be thrown upward. It will be apparent, that the greater the tendency toward upward movement, the more closely will the conical sleeve be confined and resistant to upward movement.

A stamped or pressed metal plate 17 secured against the front face of the engine, is preferably provided with a forwardly pressed or bulged out portion 18, to form a housing or inclosure for the timing gear mechanism. A peripheral reinforcing flange 19 surrounds the margin of the plate 17, and the lower horizontal portion thereof is enlarged at each side as at 20, through which extends a mounting bolt or stud 21 passing through an opening in the transverse frame member 2. A dependent circular flange 22 is struck down about the opening in the frame member, and an elastic pad 23, of rubber or the like, is inserted between the flange 20 and the frame member, and extends through the opening defined by the circular flange 22. Another elastic pad 24 is carried by the bolt 21, and a washer 25 affording increased bearing surface therefor, abuts against the bottom of the circular flange 22, whereby movement in all directions is cushioned by the two pads 23 and 24. Retainer cups 26 may also be provided for the respective elastic pads 23 and 24.

Having thus described my invention I claim:

1. Means for mounting the front of an engine on a chassis frame including a pressed metal timing gear cover secured to the front face of the engine and having lateral extensions provided with a horizontal flange, a frame member having an opening defined by a dependent circular flange, an elastic pad interposed between the frame member and said horizontal flange and having a portion extending through said flanged opening, a fastening bolt passing through said pad, and a second pad of elastic material carried by said bolt and having a bearing against the bottom of said circular flange.

2. The structure of claim 1 wherein a bearing washer is interposed between the bottom of the circular flange and adjacent elastic pad to afford increased bearing surface.

In testimony whereof I affix my signature.

JOHN G. WOOD.